(12) United States Patent
Kurohara (10) Patent No.: US 10,427,231 B2
(45) Date of Patent: Oct. 1, 2019

(54) NUMERICAL CONTROLLER

(71) Applicant: FANUC Corporation, Minamitsuru-gun, Yamanashi (JP)

(72) Inventor: Yasuyuki Kurohara, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 76 days.

(21) Appl. No.: 15/148,364

(22) Filed: May 6, 2016

(65) Prior Publication Data
US 2016/0332245 A1 Nov. 17, 2016

(30) Foreign Application Priority Data
May 13, 2015 (JP) .................................. 2015-098356

(51) Int. Cl.
*B23H 1/02* (2006.01)
*B23H 3/04* (2006.01)
(Continued)

(52) U.S. Cl.
CPC ................. *B23H 1/02* (2013.01); *B23H 3/04* (2013.01); *B23H 7/06* (2013.01); *B23H 7/20* (2013.01);
(Continued)

(58) Field of Classification Search
CPC . B23H 7/10; B23H 7/102; B23H 7/20; B23H 1/024; G05B 2219/45043
(Continued)

(56) References Cited

U.S. PATENT DOCUMENTS 3,601,571 A * 8/1971 Curcio ..................... H05B 6/04
219/650
3,601,572 A * 8/1971 Check ...................... B23H 1/00
219/69.13
(Continued)

FOREIGN PATENT DOCUMENTS

DE 4243392 A1 7/1994
EP 2181791 A2 5/2010
(Continued)

OTHER PUBLICATIONS

Extended European Search Report dated Sep. 19, 2016 in European Patent Application No. 16169097.9.
(Continued)

*Primary Examiner* — Ibrahime A Abraham
*Assistant Examiner* — Frederick F Calvetti
(74) *Attorney, Agent, or Firm* — Drinker Biddle & Reath LLP (57) ABSTRACT

A numerical controller controlling a wire electric discharge machining device of the present invention is configured to perform perpendicular setting of the wire electrode with respect to the workpiece while the wire electrode is inserted into and passed through a machining hole of a workpiece and calculate the inclination of the workpiece; drive an XY axis and detect short-circuit; obtain the diameter of the machining start hole; subsequently drive the upper wire guide and the lower wire guide respectively and detect the short-circuit and calculate the location of the center of the upper portion of the machining start hole and the location of the center of the lower portion of the machining start hole; and, based on these calculated values, calculate the correction amount for the workpiece on the upper wire guide surface of the upper wire guide and the correction amount
(Continued)

for the workpiece on the lower wire guide surface of the lower wire guide.

4 Claims, 9 Drawing Sheets

(51) Int. Cl.
  *B23H 7/06* (2006.01)
  *B23H 7/20* (2006.01)
  *G05B 19/404* (2006.01)
(52) U.S. Cl.
  CPC ........ *G05B 19/404* (2013.01); *B23H 2500/20* (2013.01); *G05B 2219/45043* (2013.01); *G05B 2219/49177* (2013.01)
(58) Field of Classification Search
  USPC ..................... 219/69.12, 69.13, 69.16, 69.19
  See application file for complete search history.

(56) References Cited

U.S. PATENT DOCUMENTS

| | | | |
|---|---|---|---|
| 5,444,205 A | 8/1995 | Lodetti | |
| 5,744,775 A | 4/1998 | Yasuda et al. | |
| 2001/0012973 A1* | 8/2001 | Wehrli | B23Q 17/22 700/193 |
| 2004/0084419 A1* | 5/2004 | Kato | B23H 7/065 219/69.12 |
| 2009/0240482 A1* | 9/2009 | Naganawa | G05B 19/4069 703/13 |
| 2012/0089247 A1* | 4/2012 | Kawauchi | B23Q 17/20 700/178 |
| 2013/0211577 A1* | 8/2013 | Yamane | B23H 7/065 700/186 |
| 2016/0031025 A1* | 2/2016 | Shirai | B23H 1/024 219/69.13 |
| 2017/0072490 A1* | 3/2017 | Hamada | B23H 7/20 |
| 2017/0095869 A1* | 4/2017 | Domori | B23H 7/20 |

FOREIGN PATENT DOCUMENTS

| | | | |
|---|---|---|---|
| EP | 2626161 A2 | | 8/2013 |
| JP | 63134124 | * | 6/1988 |
| JP | H02-139129 A | | 5/1990 |
| JP | 02180539 | * | 7/1990 |
| JP | H05-002826 U | | 1/1993 |
| JP | H07-68420 A | | 3/1995 |
| JP | H08-243846 A | | 9/1996 |

OTHER PUBLICATIONS

Decision to Grant a Patent dated May 23, 2017 in Japanese Patent Application No. 2015-098356 (3 pages) with an English translation (3 pages).

* cited by examiner

CASE WHERE WIRE ELECTRODE IS INCLINED
WITH RESPECT TO INNER WALL OF MACHINING
START HOLE

FIG. 4B

CASE WHERE WIRE ELECTRODE IS HORIZONTAL
TO INNER WALL OF MACHINING START HOLE

NUMERICAL CONTROLLER

RELATED APPLICATION DATA

This application claims priority under 35 U.S.C. § 119 and/or § 365 to Japanese Application No. 2015-098356 filed May 13, 2015, the entire contents is incorporated herein by reference.

BACKGROUND OF THE INVENTION

1. Field of the Invention

The present invention relates to a numerical controller.

2. Description of the Related Art

Figure 14:
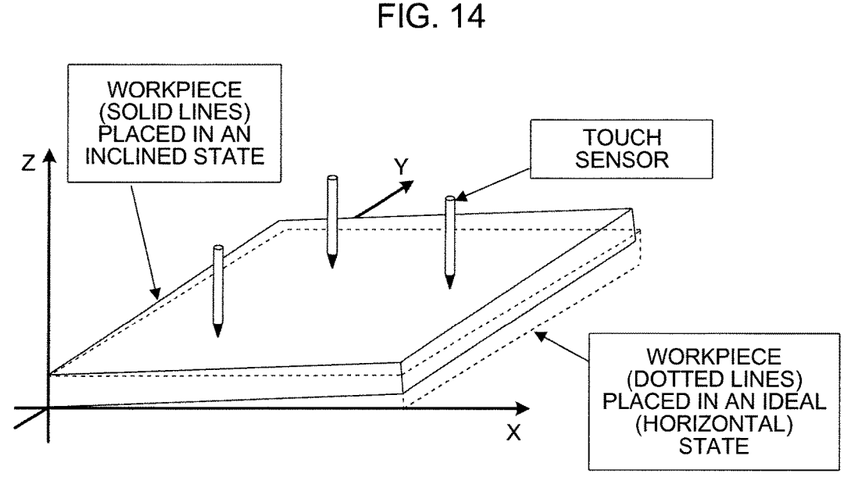
FIG. 14 is a diagram illustrating a state of the art method of calculating the inclination of the workpiece.

A workpiece needs to be placed horizontally on a workpiece placement table for high-accuracy processing using a wire electric discharge machining device. However, ideal placement of the workpiece in practice is not always possible. For example, it may happen that the workpiece is placed on the workpiece placement table without being horizontally placed due to dust remaining between the workpiece and the workpiece placement table or due to incorrect mounting of a tool for fixation of the workpiece. In view of these situations, as illustrated in FIG. 14, there are techniques of workpiece placement error correction according to which three representative points on the workpiece surface are measured by a touch sensor or the like and thereby the inclination of the workpiece is calculated, and then upper and lower wire guide positions are corrected (for example, see German Patent Application Laid-Open No. 4243392).

Also, Japanese Patent Laid-Open No. 08-243846 discloses a state of the art technique which uses electric discharging by making a wire and a workpiece close to each other and obtains the discharge position, thereby calculating the inclination of the wire electrode and performs the perpendicular setting of the wire. This state of the art technique makes it possible at the time of the wire perpendicular setting to obtain necessary date for the workpiece placement error correction and to correct the placement error of the workpiece.

Figure 15:
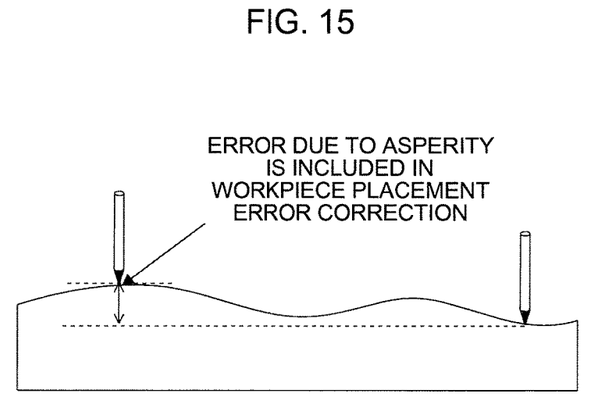
FIG. 15 is a diagram illustrating a problem associated with the state of the art method of calculating the inclination of the workpiece.

However, when the workpiece placement error correction technique described in the German Patent Application Laid-Open No. 4243392 is used, it is difficult to use the technique when the workpiece surface is not smooth. For example, in a case where the placement error of a workpiece such as a casting whose workpiece surface is rough is corrected, even when it is attempted to calculate the inclination of the workpiece based on the three representative points, as illustrated in FIG. 15, the positions of the representative points obtained by the touch sensor is displaced due to the roughness, as a result of which an error due to roughness is included in the inclination of the workpiece calculated based on these positions, making it difficult to achieve accurate corrections.

Also, in a case where it is attempted to correct the placement error of the workpiece using the techniques disclosed in Japanese Patent Laid-Open No. 08-243846, it is possible to correct the inclinations of the wire electrode and the workpiece, but the disclosed techniques do not perform error correction that takes into account the accurate and strict positional relationship between the upper and lower wire guides and the portion to be subjected to the machining process of the workpiece, which implies that this technique has problems that needs to be addressed in terms of its accuracy.

SUMMARY OF THE INVENTION

In view of the above, an object of the present invention is to provide a numerical controller that is capable of calculating a workpiece placement error correction amount regardless of the undulation and surface roughness of the workpiece and without using a dedicated measuring instrument such as a touch sensor probe.

The numerical controller in accordance with the present invention is adapted to provide machining for a workpiece by controlling a wire electric discharge machining device. The wire electric discharge machining device has an XY axis adapted to control the workpiece relatively with respect to a wire electrode in a horizontal direction and a UV axis adapted to control at least either one of an upper wire guide and a lower wire guide in the horizontal direction.

The numerical controller includes: a perpendicular setting control unit configured to cause the wire electrode to be oriented perpendicular to the workpiece by controlling at least either one of the XY axis and the UV axis and causing the wire electrode to be oriented in parallel with a direction in which a machining start hole extends, the wire electrode being inserted into and extending through at least one machining start hole provided in and perpendicular to the workpiece; an inclination degree calculation unit configured to calculate an inclination of the workpiece with respect to the XY axis on the basis of a position of the UV axis in response to the wire electrode being made to be perpendicular to the workpiece by the perpendicular setting control unit; a machining start hole diameter calculation unit configured to calculate a diameter of the machining start hole by controlling the XY axis and detecting a short-circuit state between the wire electrode and an inner wall of the machining start hole; an upper-location-of-center calculation unit configured to obtain a location of a center of an upper portion of the machining start hole by controlling a relative position of the upper wire guide relative to the workpiece and detecting the short-circuit state between the wire electrode inserted into and extending through the machining start hole and the inner wall of the machining start hole; a lower-location-of-center calculation unit configured to obtain a location of a center of a lower portion of the machining start hole by controlling a relative position of the lower wire guide relative to the workpiece and detecting the short-circuit state between the wire electrode inserted into and extending through the machining start hole and the inner wall of the machining start hole; and a workpiece placement error correction amount calculation unit configured to calculate an amount of correction of the upper wire guide with respect to the workpiece on a surface of the upper wire guide and calculate an amount of correction of the lower wire guide with respect to the workpiece on a surface of the lower wire guide on the basis of the inclination of the workpiece calculated by the inclination degree calculation unit, the diameter of the machining start hole calculated by the machining start hole diameter calculation unit, the location of the center of the upper portion of the machining start hole calculated by the upper-location-of-center calculation unit, and the location of the center of the lower portion of the machining start hole calculated by the lower-location-of-center calculation unit.

In accordance with the present invention, it is made possible to use the workpiece placement error correction regardless of the undulation and surface roughness of the workpiece. In addition, since no dedicated measuring instrument such as a touch sensor probe is necessary, it is made possible to save time equivalent to the time required for removal of the instrument.

BRIEF DESCRIPTION OF THE DRAWINGS

The above-mentioned and other objects and features of the present invention will become apparent from reading of the explanations of the following exemplary embodiment with reference to the attached drawings, in which.

DETAILED DESCRIPTION OF THE PREFERRED EMBODIMENTS

In accordance with the present invention, correction of an error in placement of a workpiece (which is hereinafter referred to as "a workpiece placement error correction") is achieved by using a hole at which the machining for the workpiece is to be started (which is hereinafter referred to as "a machining start hole"), the machining start hole being formed perpendicular to the workpiece.

Figure 1:
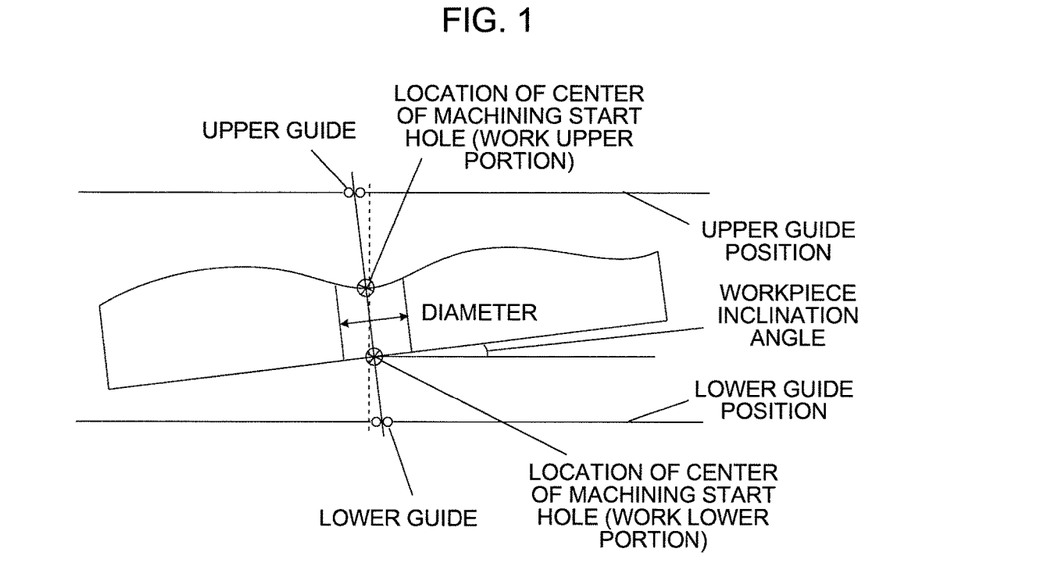
FIG. 1 is a diagram illustrating the overview of the workpiece placement error correction method in accordance with the present invention.

FIG. 1 is a diagram that illustrates an overview of the workpiece placement error correction method in accordance with one embodiment of the present invention. In accordance with the present invention, perpendicular setting of a wire with respect to the machining start hole is first performed using short-circuit between the wire and the workpiece. After the perpendicular setting of the wire has been performed, information indicative of a workpiece inclination angle, information indicative of the diameter of the machining start hole, and information indicative of the location of the center of the machining start hole are obtained. On the basis of these pieces of information, amounts of correction to be made to the positions of upper and lower wire guides can be calculated using the calculation method associated with the workpiece placement error correction technique.

The wire electric discharge machining device is generally configured to drive the upper wire guide via a UV axis. Suppose here that the inclination of the wire is to be corrected by the UV axis. In this case, even when the correction is performed such that the wire is placed perpendicular to the workpiece, the positions of the wire and the portion to be machined of the workpiece may not be in position relative to each other. However, in accordance with the present invention, the UV axis and the XY axis are corrected, as illustrated in FIG. 1, using the information on the location of the center of the machining start hole, and thus the positions of both of the upper and lower wire guides with respect to the machining start hole are adjusted, and thereby the inclination of the wire is corrected, so that high-accuracy workpiece placement error correction is achieved. It may also be contemplated that multiple sets of pieces of information on the workpiece inclination angles, the diameter of the machining start holes, and the location of the center of the machining start hole regarding multiple machining start hole are obtained for one single workpiece and thereby accuracy in the workpiece placement error correction can be increased.

Figure 2:
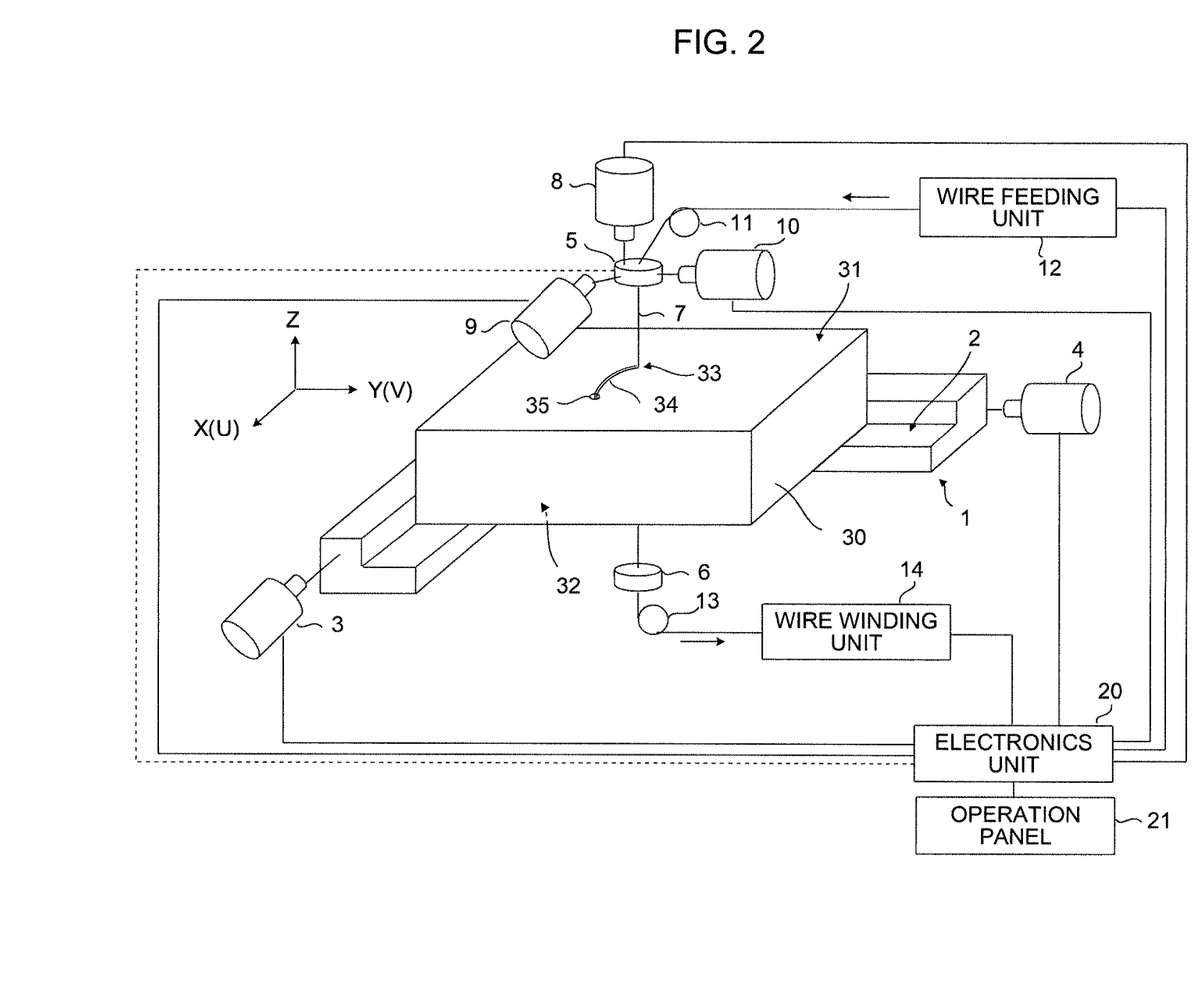
FIG. 2 is a block diagram illustrating the principal units of a wire electric discharge machining device.

FIG. 2 is a diagram that illustrates the general configuration of the wire electric discharge machining device that is adopted in accordance with one embodiment of the present invention. The configuration associated with machining of this wire electric discharge machining device is the same or similar to that of a conventional machine.

Specifically, the reference sign 1 represents a workpiece placement table. The workpiece placement table is configured to place and fix thereon the workpiece 30 to be subjected to the machining process and includes a placement surface 2 having flatness with high accuracy. During the machining process, the workpiece 30 is placed on and fixed to the workpiece placement table such that the bottom surface 32 of the workpiece 30 is brought into contact with the placement surface 2. The workpiece 30 is formed such that the entire upper surface 31 is in parallel with the bottom surface 32. It is contemplated here that the workpiece 30 is the one that includes a surface (a flat region) that extends in parallel with the bottom surface 32. In this figure, the workpiece 30 depicted by way of example has a rectangular shape and the entire upper surface 31 is formed as a surface that extends in parallel with the bottom surface 32. Meanwhile, it may also be contemplated that only part of the entire region of the upper surface is formed as the surface that extends in parallel with the bottom surface 32.

The reference sign 7 represents the wire electrode. The wire electrode is fed from a wire feeding unit 12 and via a guide roller 11 and any other relevant element so as to perform electric discharge machining for the workpiece 30. During the machining process, the wire electrode is stretched by the wire connection operation between the upper and lower wire guides 5, 6 and voltage is applied thereto for generating electric discharge between the electrode and the workpiece 30. The reference sign 14 represents a wire winding unit which has a function of pulling and retracting the wire electrode 7 passed through the lower wire guide 6, the guide roller 13, and any other relevant element with a predetermined tension.

The portion to be subjected to the machining process is the linear portion of the workpiece 30 through which the wire electrode 7 is passed. It is contemplated here that the linear portion is represented by a machining point 33 on the upper surface 31 (which may also be represented by a point on the bottom surface 32 as will be later described). In order to move the machining point 33 along an intended locus on the workpiece 30 (which may also be referred to as a "machining line" and in normal cases specified by a machining program), the workpiece placement table 1 is configured to be movable on the XY plane by an X-axis driving mechanism 3 and a Y-axis driving mechanism 4 whose driving sources are their respective servo motors.

The reference sign 34 represents by way of example the locus of movement of the machining point 33 (machining line along which the machining process has been completed).

It should be noted, as will be described later, that the lower wire guide 6 in place of the workpiece placement table 1 may be moved on the XY plane by the X-axis driving mechanism 3 and the Y-axis driving mechanism 4. Also, the upper wire guide 5 is configured such that its XYZ position can be adjusted by a Z-axis driving mechanism 8, a U-axis driving mechanism 9, and a V-axis driving mechanism 10.

In general, adjustment of the Z position is used to make the distance between the upper wire guide 5 and the upper surface 31 of the workpiece 30 at the time of machining a predetermined appropriate value. In addition to this, this embodiment also relies on the Z-position adjustment to measure the inclination of the workpiece 30 (error in the placement attitude).

Meanwhile, the U-axis/V-axis driving mechanisms 9 and 10 are in general used in angle adjustment of the above described taper machining process. In this embodiment, these mechanisms 9, 10 are also used in adjustment of the position of the upper wire guide on the basis of the above measurement results so as to compensate for an error in the placement attitude of the workpiece 30.

The reference sign 20 represents an electronics unit, which incorporates in a well-known manner a numerical controller including a CPU, a numerical control unit (CNC), a memory unit, an input/output device (devices interfacing with external elements); a power source for feeding predetermined necessary voltage/current to electric elements including the wire electrode; and other relevant elements.

The numerical control unit (CNC) is configured to control the servo motors that individually drive the XYZ axes and the UV axes. The input/output device (I/O) is configured to perform control of the power source (not shown) for electric discharge, control of feeding of the wire, control of display of information on a display unit (provided on the operation panel 21), and other relevant controls.

In addition, other features are incorporated in a well-known manner in the electronics unit 20, including a function of monitoring load currents in each of the X, Y, Z, U, and V axes and displaying information associated with the load currents on the display screen (not shown) and a function of monitoring the potential of the wire electrode 7 with respect to the workpiece 30 and discharge current and other relevant values, and other relevant functions.

Brief explanation of the machining method using the wire electric discharge, which is well known, is provided here. In accordance with the machining program stored in the memory unit of the controller, the respective positions of the X, Y, Z, U, and V axes are servo-controlled by the numerical control unit (CNC) while the predetermined discharge voltage/current is supplied to the wire electrode 7 and thus the machining process is performed for the workpiece 30 along a predetermined cutting line or cutting surface.

As mentioned above, in normal cases, displacement of the XY position of the machining point 33 is realized by displacement of the XY axis.

Although illustration is omitted here, it should be noted that, as is well known, the workpiece placement table 1 is installed in a machining tank filled with a machining fluid, and the electric discharge machining for the workpiece 30 is performed in the machining fluid. Also, a feature is provided for circulating the machining fluid such that it flows through a thermostatic device, a cleaning device (ion-exchange resin), and other relevant devices and managing the temperature and cleanliness of the machining fluid, and this feature is controlled by the electronics unit 20. These components are not described in detail, for they are not of particular relevance in the context of the present invention.

The following describes a workpiece placement error correction method by the workpiece placement error correction function of the present invention performed in the wire electric discharge machining device that has the configuration illustrated in FIG. 2. The workpiece placement error correction method of the present invention is effectuated by the numerical controller controlling the wire electric discharge machining device and executing calculation procedures of the location of the center of the machining start hole and the calculation procedures of the workpiece placement error correction amount.

<Procedure 1: Calculation Procedures of the Location of the Center of the Machining Start Hole>

The following describes an embodiment of the method of calculating information necessary for correction of the workpiece placement error in the wire electric discharge machining device in accordance with the present invention with reference to FIGS. 3 to 7.

Figure 3:
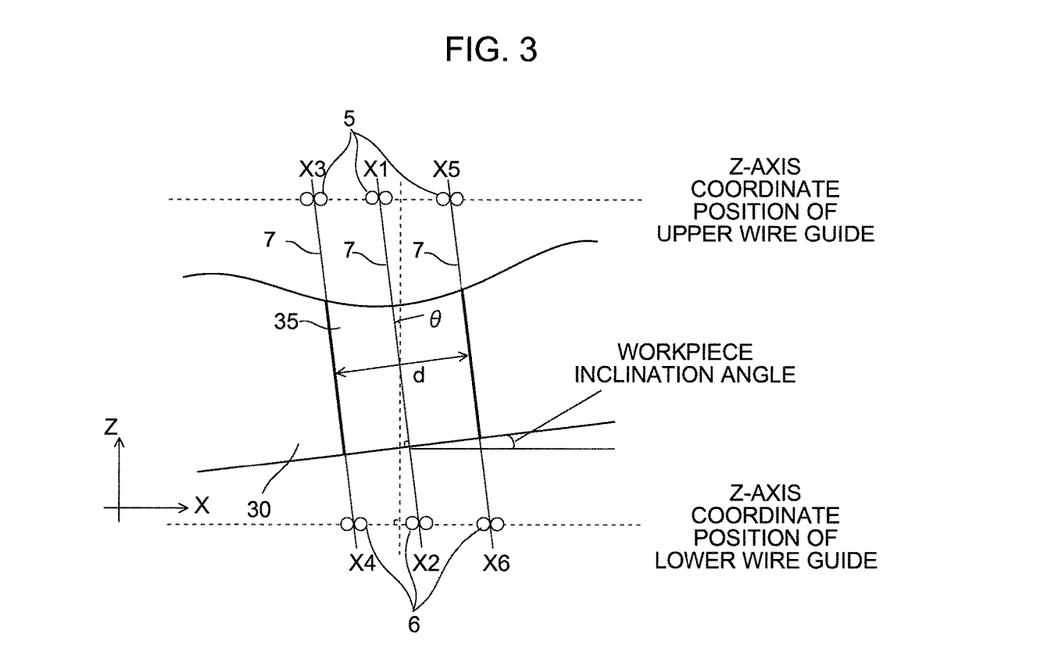
FIG. 3 is a diagram illustrating the method of calculating the inclination of the workpiece and the machining start hole diameter in accordance with the present invention.

FIG. 3 is a cross-sectional view of the workpiece 30 in which the machining start hole 35 is formed. In the wire electric discharge machining device, the machining start hole 35 is processed such that it extends perpendicular to the workpiece 30. In this state, the upper wire guide 5 and the lower wire guide 6 are displaced to take a predetermined coordinate position on the Z axis, the state where the wire electrode 7 is perpendicular to the workpiece 30 is exited, and thus the short-circuit position is detected. In this manner, the diameter of the machining start hole, the workpiece inclination angle, and the location of the center of the machining start hole at the upper and lower surface portions of the workpiece are calculated.

First, in order to place the wire electrode 7 in a state where it is perpendicular to the workpiece 30, a perpendicular setting technique is used as represented by patent literature 2 titled "Apparatus and Method of Wire Electric Discharge Machining" which uses the short-circuit between the wire electrode 7 and the workpiece 30.

Figure 4A:
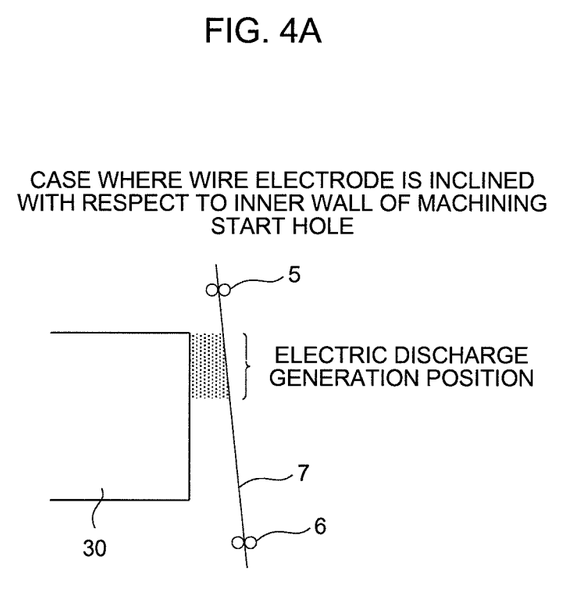
FIG. 4A is a diagram illustrating a perpendicular setting method for the wire electrode with respect to the workpiece and depicting a case where the wire electrode is inclined with respect to the inner wall of the machining start hole.
Figure 4B:
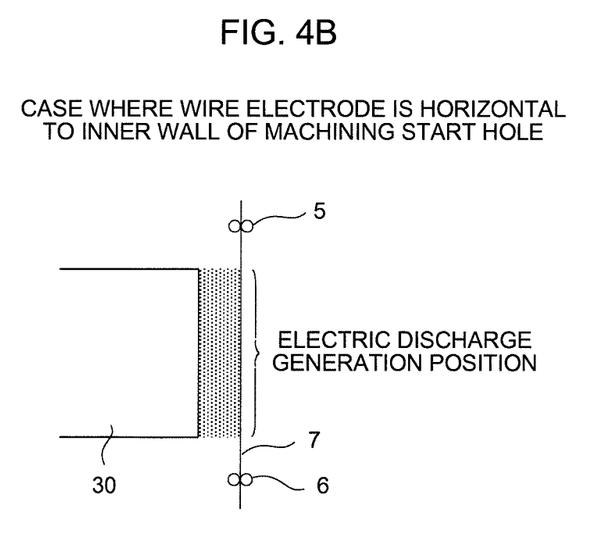
FIG. 4B is a diagram illustrating a perpendicular setting method for the wire electrode with respect to the workpiece and depicting a case where the wire electrode is horizontal to the inner wall of the machining start hole.

In the perpendicular setting, in a state where a voltage for detection of the discharge position is applied to the wire electrode 7, the wire electrode 7 is made to approach the inner wall of the machining start hole 35 and the position (or range) at which a predetermined number of times of discharge occurred is detected. As illustrated in FIG. 4A, when the wire electrode 7 is inclined with respect to the inner wall of the machining start hole 35, the electric discharge phenomena concentrate in the range where the wire electrode 7 and the inner wall of the machining start hole 35 are close to each other. In contrast, as illustrated in FIG. 4B, when the wire electrode 7 is in parallel with the inner wall of the machining start hole 35, electric discharge phenomena occur across the entire inner wall. As a result, the perpendicular setting of the wire electrode with respect to the inner wall of the machining start hole 35 of the workpiece 30 can be performed by adjusting the UV axis when the former state has been detected.

Also, the workpiece inclination angle θ is obtained based on the inclination angle of the wire electrode 7 in the perpendicular state.

Next, as illustrated in FIG. 3, the X axis is driven while the wire electrode 7 remains in the perpendicular state with respect to the workpiece 30, and the wire electrode 7 is made to be short-circuited with both ends in the X axis of the machining start hole 35, and the positions X3 and X5 of the upper wire guide 5 at the time of the short-circuit and the positions X4 and X6 of the lower wire guide 6 at the time of the short-circuit are detected. On the basis of these detection results, the diameter d of the machining start hole 35 is calculated. If the coordinates of X5 are (X5, Z5) and the coordinates of X3 are (X3, Z3), then the diameter d of the machining start hole 35 is calculated by the following mathematical expression (Expression 1). It should be noted that the coordinates of a position Xα are expressed as (Xα, Zα) (where α is a number that may be selected as appropriate) in the following explanations in the same or similar manner as in the above explanations.

$$d = (x5 - x3) \times \cos \theta \qquad \text{[Expression 1]}$$

Figure 5:
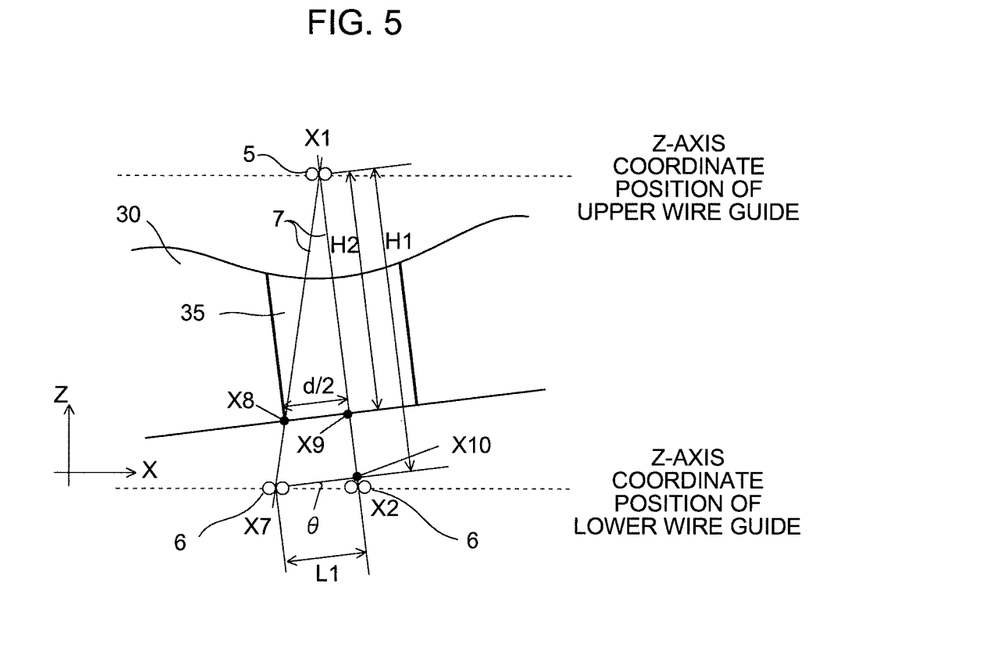
FIG. 5 is a diagram (1) illustrating a method of calculating the location of the center of the lower portion of the machining start hole in accordance with the present invention.

Next, the wire electrode 7 is displaced to reside at a position where the wire electrode 7 is perpendicular to the machining start hole 35 and passes the location of the center of the machining start hole 35. Also, as illustrated in FIG. 5, the lower wire guide 6 is displaced to be short-circuited with one end of the machining start hole 35, and a short-circuit position X8 between the one end of the machining start hole 35 and the wire electrode 7 and a position X7 of the lower wire guide 6 at the time of the short-circuit are obtained. Further, an intersection position X10 of a perpendicular line extending from the position X7 of the lower wire guide 6 to the straight line X1-X2 and this straight line X1-X2 is obtained. By the similarity relationship between the right triangles X1-X7-X10 and X1-X8-X9, the length H2 of the perpendicular line extending from the position of the upper wire guide 5 to the lower portion surface of the machining start hole 35 of the workpiece 30 is calculated by the following mathematical expression (Expression 2):

$$H2 = H1 \times \frac{d/2}{L1} \qquad \text{[Expression 2]}$$

Also, L1 and H1 are calculated by the following mathematical expressions (Expression 3):

$$L1 = (x2 - x7) \times \cos \theta$$

$$H1 = \sqrt{(x1-x2)^2 + (z1-z2)^2} - (x2-x7) \times \sin \qquad \text{[Expression 3]}$$

Figure 6:
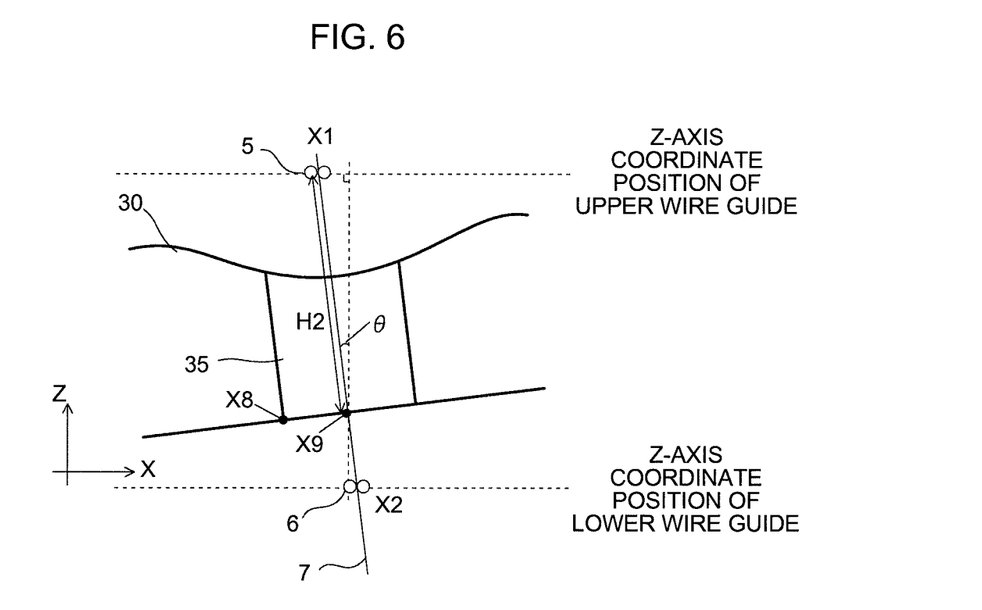
FIG. 6 is a diagram (2) illustrating a method of calculating the location of the center of the lower portion of the machining start hole in accordance with the present invention.

Hence, referring to FIG. 6, the coordinate position of the center X9 of the lower portion of the machining start hole 35 of the workpiece 30 is given as (X1+H2*sin θ, Z1−H2×cos θ).

Figure 7:
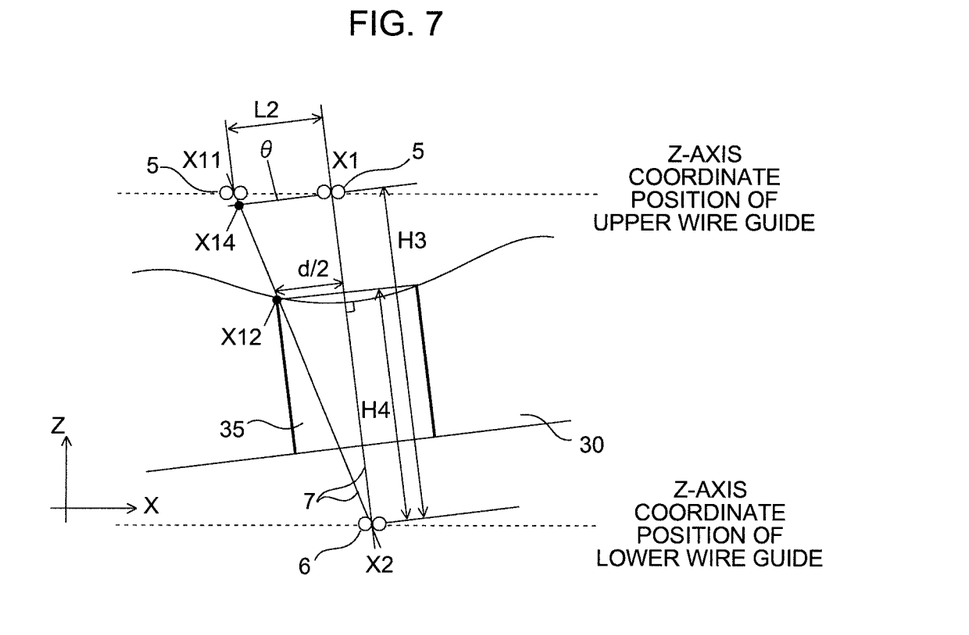
FIG. 7 is a diagram (1) illustrating a method of calculating the location of the center of the upper portion of the machining start hole in accordance with the present invention.

Finally, the wire electrode 7 is displaced to reside at a position where it is in the perpendicular state with respect to the machining start hole 35 and passes the location of the center of the machining start hole 35. As illustrated in FIG. 7, the upper wire guide 5 is displaced to be short-circuited with one end of the machining start hole 35, and the short-circuit position X12 between the one end of the machining start hole 35 and the wire electrode 7, and the position X11 of the upper wire guide 5 at the time of the short-circuit are obtained. Further, a point X14 is created on the straight line X2-X11 such that the angle X2-X1-X14 becomes a right angle. By the similarity relationship between the right triangles X1-X2-X14 and X13-X2-X12, the length H4 of the perpendicular line extending from the position X2 of the lower wire guide 6 to the upper portion surface of the machining start hole 35 of the workpiece 30 is calculated by the following mathematical expression (Expression 4):

$$H4 = H3 \times \frac{d/2}{L2} \qquad \text{[Expression 4]}$$

Also, L2 and H3 are calculated by the following mathematical expressions (Expression 5):

$$L2 = (x1 - x11) \times \cos \theta$$

$$H3 = \sqrt{(x1-x2)^2 + (z1-z2)^2} \qquad \text{[Expression 5]}$$

Figure 8:
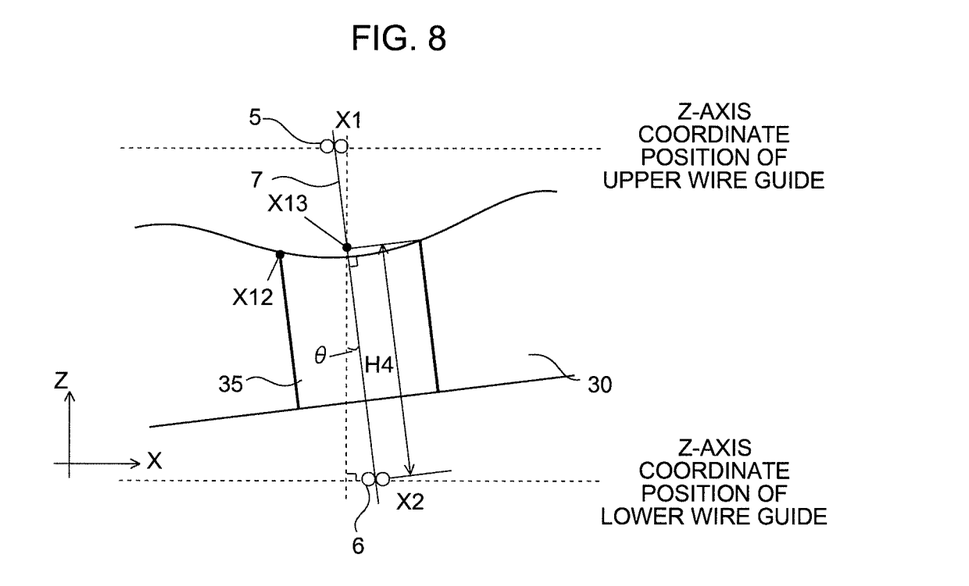
FIG. 8 is a diagram (2) illustrating a method of calculating the location of the center of the upper portion of the machining start hole in accordance with the present invention.

Hence, referring to FIG. 8, the coordinate position of the center X13 of the upper portion of the machining start hole 35 of the workpiece 30 will be (X2−H4×sin θ, Z2+H4×cos θ).

The above-described method is performed for the Y axis as well and the centers in the Y axis direction of the upper and lower portions of the machining start hole 35 of the workpiece 30 are also obtained.

<Procedure 2: Calculation Procedures of the Workpiece Placement Error Correction Amount>

The following describes the method of calculating the workpiece placement error correction amount using the respective values that are calculated by the above described method.

Figure 9:
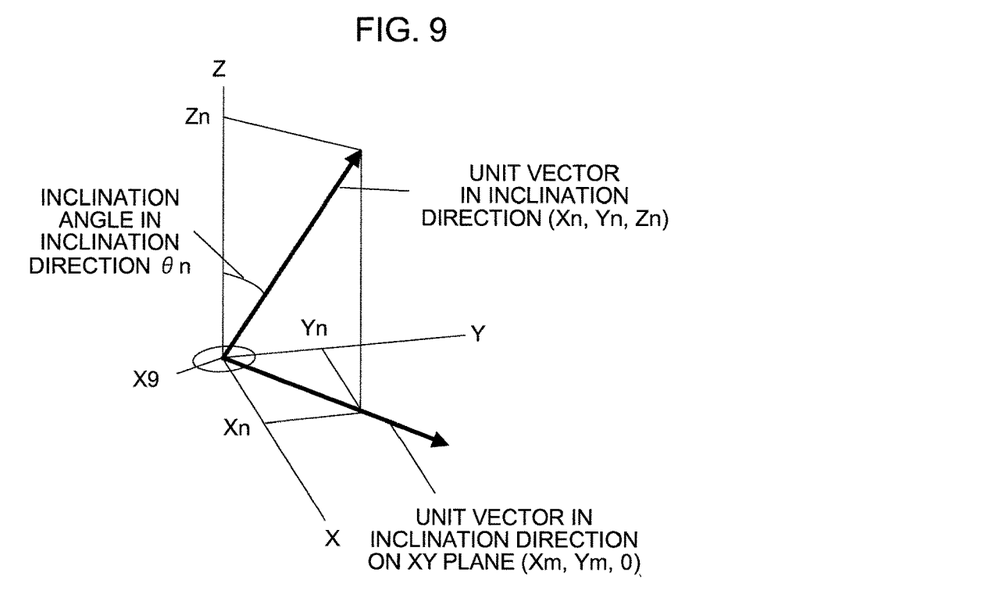
FIG. 9 is a diagram illustrating a coordinate system with a center thereof is given as the location of the center of the lower portion of the machining start hole.

FIG. 9 illustrates a coordinate system with a center thereof given as the location of the center X9 of the lower portion of the machining start hole 35 of the workpiece 30. First, from the difference between the coordinates of the locations of the centers of the upper and lower portions of the machining start hole 35 of the workpiece 30 in the X axis and the Y axis, the unit vector (Xn, Yn, Zn) in the inclination direction of the workpiece is obtained. Also, on the basis of the unit vector (Xn, Yn, Zn) of the workpiece 30 in the inclination direction, the inclination angle θn of the inclination direction is obtained. Further, using the following mathematical expressions (Expression 6), the unit vector (Xm, Ym, 0) on the XY plane in the inclination direction of the workpiece 30 is obtained.

$$X_m = \frac{X_n}{\sqrt{X_n^2 + Y_n^2}} \qquad \text{[Expression 6]}$$

-continued $$Y_m = \frac{Y_n}{\sqrt{X_n^2 + Y_n^2}}$$

Figure 10:
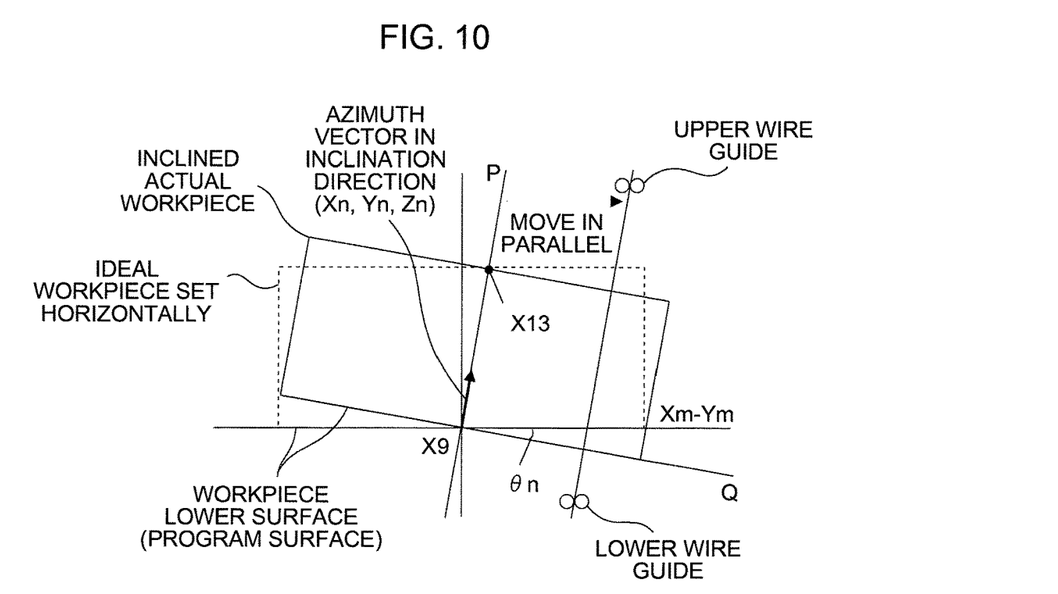
FIG. 10 is a diagram illustrating the positions of the workpiece and the wire electrode on a plane including a unit vector in the inclination direction of the workpiece and the Z axis.

Based on FIG. 9, let us consider the current coordinate value of the wire electrode 7 on a plane that includes the unit vector (Xm, Y m, 0) on the XY plane in the inclination direction and the Z axis, which is depicted in FIG. 10. To simplify the discussion, suppose that the workpiece that has been detected is recognized as a rectangular parallelepiped and the lower surface of the workpiece 30 is defined as the program surface (which is a surface on which the XY position is instructed by the machining program). Also, the straight line X9-P and the straight line X9-Q depicted in FIG. 10 represent a straight line obtained by extending the unit vector in the inclination direction and a perpendicular straight line that is perpendicular to the unit vector in the inclination direction, respectively. The lower surface of the workpiece 30 is inclined such that it overlaps the straight line X9-Q. At this point, suppose that the upper and lower wire guides on the straight line X9-P are displaced in parallel in the positive direction with respect to the Xm-Ym axis.

Figure 11:
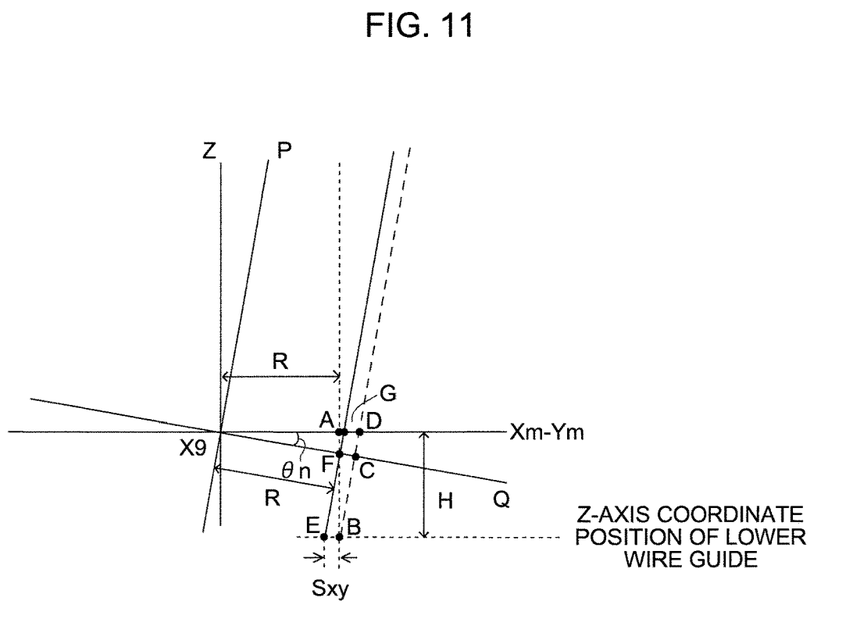
FIG. 11 is a diagram (1) illustrating a method of calculating workpiece placement error correction amount in accordance with the present invention.

FIG. 11 is a simplified version of FIG. 10. With regard to the horizontally placed ideal workpiece 30, when the wire electrode 7 is perpendicularly placed at a position that is away by an amount of R from the point X9, then the straight line AB is obtained. When the upper wire guide 5 is displaced so that this line AB is inclined by the inclination angle θn in the inclination direction, then the straight line BCD is obtained. At this point, the machining position on the program surface of the inclined workpiece bottom surface will be the point C on the straight line X9-Q, which is different than the position of the point F that is away from the point X9 by the distance R in the direction of the straight line X9-Q.

The difference of these positions is the error created when the correction is only made by the upper wire guide 5.

Hence, when displacement is to be made to reside on the straight line EFG passing the point F, the displacement of the lower wire guide 6 will correspond to the displacement amount R with respect to the horizontally placed workpiece that is corrected by the distance BE. Now, if the distance between the workpiece placement table and the lower guide is H, then the distance X9-D and the distance Sxy (=distance BE) are expressed by the following mathematical expressions, respectively (Expression 7):

DISTANCE $X9\text{-}D = R + H \times \tan\theta n$     [Expression 7]

DISTANCE $Sxy = $ (DISTANCE $X9\text{-}G$) −
(DISTANCE $X9\text{-}D$)

$$= R\left(\frac{1}{\cos\theta n} - 1\right) - H \times \tan\theta n$$

1 Distance

Here, if the position of the straight line AB at the lower wire guide 6 is (Xr, Yr), then the displacement amount R is expressed by the following mathematical expression (Expression 8):

$R = Xr \times Xm + Yr \times Ym$     [Expression 8]

Hence, if the position of the lower guide is given, then the correction amount Sxy can be calculated on the basis of the inclination direction of the workpiece and its coordinate position. Also, the correction vectors (Sx, Sy) of the respective X and Y axes are given by the following mathematical expressions (Expression 9), respectively:

$SX = Sxy \times Xm$ $Sy = Sxy \times Ym$     [Expression 9]

Figure 12:
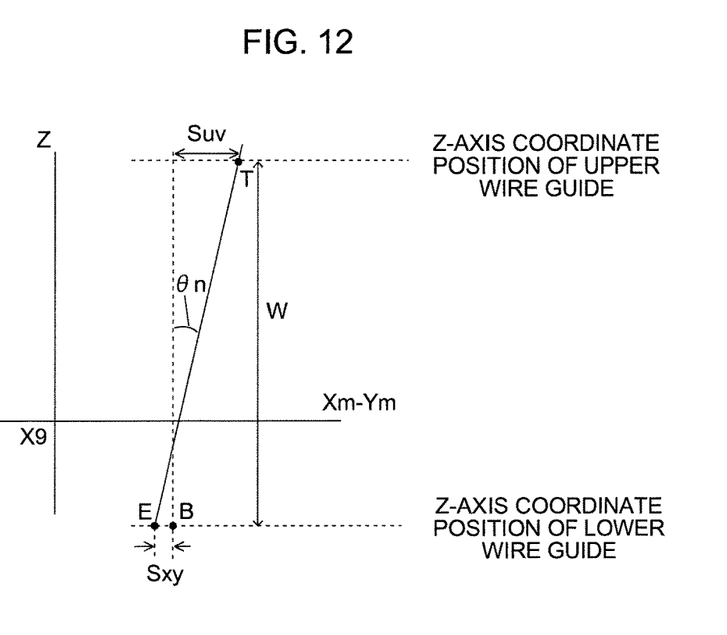
FIG. 12 is a diagram (2) illustrating a method of calculating workpiece placement error correction amount in accordance with the present invention.

Finally, the correction amount Suv of the upper wire guide 5, and the respective correction vectors (Su, Sv) of the U axis and the V axis are calculated. Referring to FIG. 12, if the distance between the upper and lower wire guides is W, then Suv, Su, and Sv can be calculated by using the following mathematical expressions (Expression 10), respectively:

$Suv = W \times \tan\theta_n - Sxy$ $Su = Suv \times Xm$ $Sv = Suv \times Ym$     [Expression 10]

Figure 13:
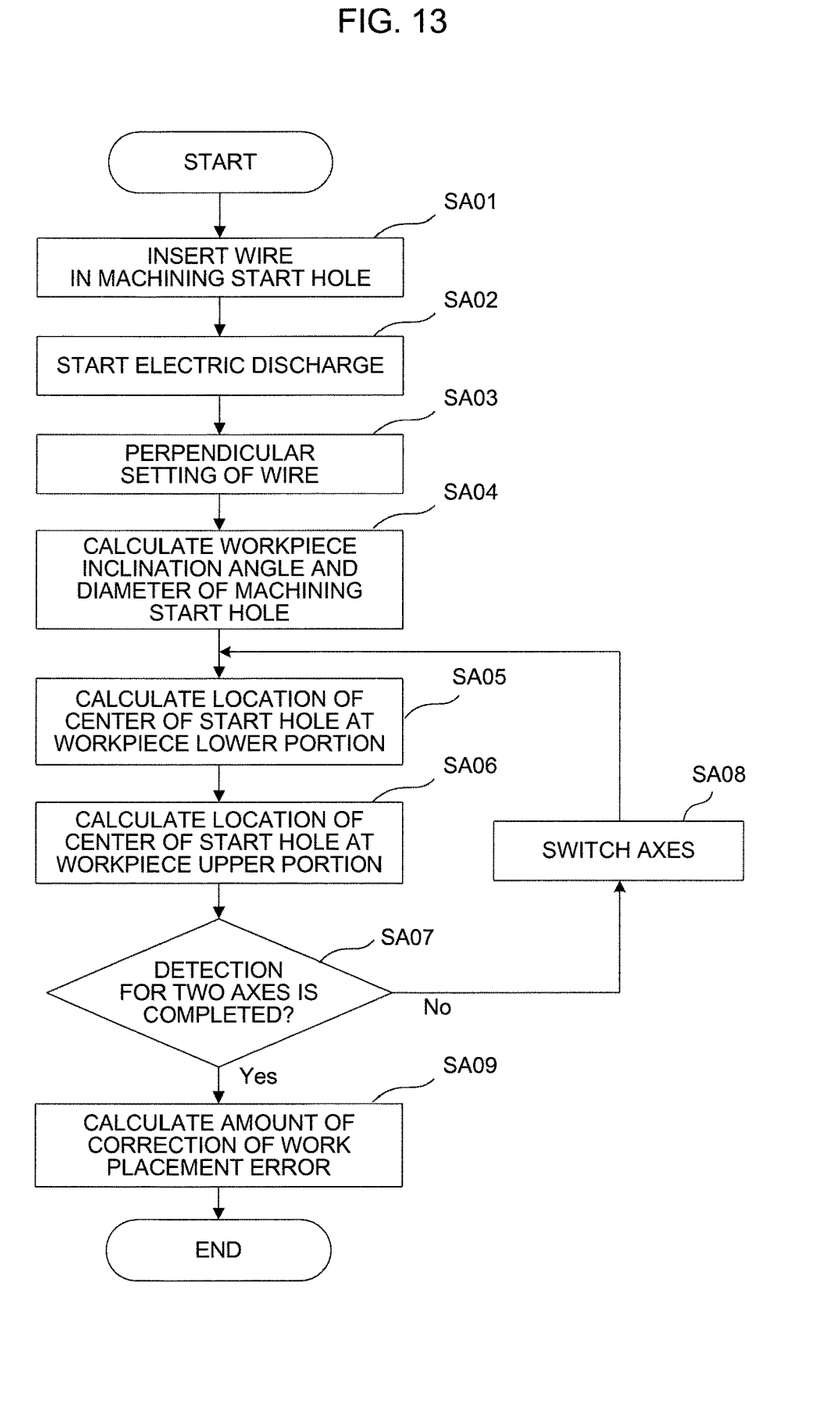
FIG. 13 is a general flowchart illustrating the procedures of the workpiece placement error correction in accordance with the present invention.

FIG. 13 is a general flowchart illustrating the above-described calculation procedures of the location of the center of the machining start hole and the calculation procedures of the workpiece placement error correction amount.

[Step SA01] This step is associated with implementation of control such that the XY axis of the wire electric discharge machining device is controlled and thereby the upper and lower wire guides are made to be placed in the position corresponding to the machining start hole and the wire is inserted into the machining start hole by an automatic wire connection function or the like function.

[Step SA02] This step is associated with turning on the power source for detection of the electric discharge position and application of voltage to the wire electrode. [Step SA03] This step is associated with causing the wire electrode to approach the inner wall of the machining start hole in a state where the voltage is applied to the wire electrode, adjusting the position of the UV axis while detecting the discharge position, and thus performing the perpendicular setting of the wire electrode with respect to the inner wall of the machining start hole.

[Step SA04] This step is associated with calculating the workpiece inclination angle θ based on the position of the upper and lower wire guides in a state where the perpendicular setting has been made, and detecting the short-circuit between the wire electrode and the workpiece while shifting the position of the XY axis, and thus identifying the position of the inner wall of the machining start hole, thereby calculating the diameter of the machining start hole.

[Step SA05] This step is associated with moving the wire electrode so that it resides at the location of the center of the machining start hole, and then moving the lower wire guide and detecting the short-circuit, thereby calculating the location of the center of the lower portion of the machining start hole of the workpiece.

[Step SA06] This step is associated with moving the wire electrode to the location of the center of the machining start hole, and then moving the upper wire guide and detecting the short-circuit, thereby calculating the location of the center of the upper portion of the machining start hole of the workpiece.

[Step SA07] This step is associated with detecting whether or not the calculation processing procedures of the steps SA05 and SA06 have been completed for the two axes, i.e., the X axis and the Y axis, and making the process go to the step SA09 in response to completion of the procedures for these two axes, or making the process go to the step SA08 in response to the procedures being yet to be completed for these two axes.

[Step SA08] This step is associated with switching the target axes of the calculation and making the process go back to the step SA05.

[Step SA09] This step is associated with calculating the correction amounts of the upper and lower wire guides based on the workpiece placement error on the basis of the respective values calculated in the above steps SA04 to SA06.

Having described the exemplary embodiment of the present invention, it will be appreciated that the present invention is not limited to any particular embodiment as described above and that various modifications and alterations may be made to the present invention in the form of various embodiments.

The invention claimed is:

1. A numerical controller providing machining for a workpiece by controlling a wire electric discharge machining device, the wire electric discharge machining device having an XY axis adapted to control the workpiece relatively with respect to a wire electrode in a horizontal direction and a UV axis adapted to control at least either one of an upper wire guide and a lower wire guide in the horizontal direction, the numerical controller comprising including a memory and a central processing unit (CPU), the CPU configured to perform a method:
    perpendicularly orientating the wire electrode to the workpiece by controlling at least either one of the XY axis and the UV axis;
    parallel orientating the wire electrode with a direction in which a machining start hole extends, the wire electrode being inserted into and extending through at least one machining start hole provided in and perpendicular to the workpiece by controlling the at least either one of the XY axis and the UV axis;
    calculating an inclination of the workpiece with respect to the XY axis on the basis of a position of the UV axis in response to the wire electrode being made to be perpendicular to the workpiece;
    calculating a diameter of the machining start hole by controlling the XY axis and detecting a short-circuit state between the wire electrode and an inner wall of the machining start hole;
    calculating a location of a center of an upper portion of the machining start hole by controlling a relative position of the upper wire guide relative to the workpiece and detecting the short-circuit state between the wire electrode inserted into and extending through the machining start hole and the inner wall of the machining start hole;
    calculating a location of a center of a lower portion of the machining start hole by controlling a relative position of the lower wire guide relative to the workpiece and detecting the short-circuit state between the wire electrode inserted into and extending through the machining start hole and the inner wall of the machining start hole;
    calculating an amount of correction of the upper wire guide with respect to the workpiece on a surface of the upper wire guide; and
    calculating an amount of correction of the lower wire guide with respect to the work piece on a surface of the lower wire guide on the basis of the calculated inclination of the workpiece, the calculated diameter of the machining start hole, the calculated location of the center of the upper portion of the machining start hole, and the calculated location of the center of the lower portion of the machining start hole.

2. The numerical controller according to claim 1, wherein the CPU is further configured to perform the method comprising:
    calculating a workpiece inclination angle θ based on the relative position of the upper wire guide and the relative position of the lower wire guide in a state where a perpendicular setting has been made, and detecting the short-circuit state while shifting a position of the XY axis, thereby identifying a position of the inner wall of the machining start hole, and thereby calculating the diameter of the machining start hole;
    moving the wire electrode so that the wire electrode resides at a location of a center of the machining start hole, and then moving the lower wire guide and detecting the short-circuit state, thereby calculating the location of the center of the lower portion of the machining start hole of the workpiece; and
    moving the wire electrode to the location of the center of the machining start hole, and then moving the upper wire guide and detecting the short-circuit state, thereby calculating the location of the center of the upper portion of the machining start hole of the workpiece.

3. The numerical controller according to claim 2, wherein the CPU is further configured to perform the method comprising:
    detecting whether the calculation of the location of the center of the upper portion of the machining start hole and the calculation of the location of the center of the lower portion of the machining start hole have been completed for the X axis and the Y axis;
    in response to detecting that the calculation of the location of the center of the upper portion of the machining start hole and the calculation of the location of the center of the lower portion of the machining start hole have been completed for the X axis and the Y axis, calculating the amount of correction of the upper wire guide with respect to the workpiece on the surface of the upper wire guide and calculating the amount of correction of the lower wire guide with respect to the work piece on the surface of the lower wire guide on the basis of a workpiece placement error that is based on the calculated location of the center of the upper portion of the machining start hole and the calculated location of the center of the lower portion of the machining start hole; and
    in response to detecting that the calculation of the location of the center of the upper portion of the machining start hole and the calculation of the location of the center of the lower portion of the machining start hole have not been completed for the X axis and the Y axis, switching target axes for the calculations of the location of the center of the lower portion of the machining start hole of the workpiece and of the location of the center of the upper portion of the machining start hole of the workpiece and moving the wire electrode so that the wire electrode resides at the location of a center of the machining start hole, and then moving the lower wire guide and detecting the short-circuit state, thereby calculating the location of the center of the lower portion of the machining start hole of the workpiece.

4. The numerical controller according to claim 1, wherein the CPU is further configured to perform the method comprising:
    controlling the XY axis of the wire electric discharge machining device so that the upper and lower wire guides are made to be placed in a position corresponding to the machining start hole and the wire is automatically inserted into the machining start hole;

turning on a power source for detection of an electric discharge position and an application of a voltage to the wire electrode;

causing the wire electrode to approach the inner wall of the machining start hole in a state where the voltage is applied to the wire electrode, and adjusting the position of the UV axis while detecting the electric discharge position, thereby performing a perpendicular setting of the wire electrode with respect to the inner wall of the machining start hole;

calculating a workpiece inclination angle θ based on the relative position of the upper wire guide and the relative position of the lower wire guide in a state where the perpendicular setting has been made, and detecting the short-circuit state between the wire electrode and the workpiece while shifting a position of the XY axis, thereby identifying a position of the inner wall of the machining start hole, and thereby calculating the diameter of the machining start hole;

moving the wire electrode so that the wire electrode resides at a location of a center of the machining start hole, and then moving the lower wire guide and detecting the short-circuit state, thereby calculating the location of the center of the lower portion of the machining start hole of the workpiece;

moving the wire electrode to the location of the center of the machining start hole, and then moving the upper wire guide and detecting the short-circuit state, thereby calculating the location of the center of the upper portion of the machining start hole of the workpiece;

detecting whether the calculation of the location of the center of the upper portion of the machining start hole and the calculation of the location of the center of the lower portion of the machining start hole have been completed for the X axis and the Y axis;

in response to detecting that the calculation of the location of the center of the upper portion of the machining start hole and the calculation of the location of the center of the lower portion of the machining start hole have been completed for the X axis and the Y axis, calculating the amount of correction of the upper wire guide with respect to the workpiece on the surface of the upper wire guide and calculating the amount of correction of the lower wire guide with respect to the work piece on the surface of the lower wire guide on the basis of a workpiece placement error that is based on the calculated location of the center of the upper portion of the machining start hole and the calculated location of the center of the lower portion of the machining start hole; and in response to detecting that the calculation of the location of the center of the upper portion of the machining start hole and the calculation of the location of the center of the lower portion of the machining start hole have not been completed for the X axis and the Y axis, switching target axes for the calculations of the location of the center of the lower portion of the machining start hole of the workpiece and of the location of the center of the upper portion of the machining start hole of the workpiece and moving the wire electrode so that the wire electrode resides at the location of a center of the machining start hole, and then moving the lower wire guide and detecting the short-circuit state, thereby calculating the location of the center of the lower portion of the machining start hole of the workpiece.

* * * * *